(12) United States Patent
Mori et al.

(10) Patent No.: US 7,835,140 B2
(45) Date of Patent: Nov. 16, 2010

(54) GAS-INSULATED ELECTRIC POWER APPARATUS

(75) Inventors: Masataka Mori, Tokyo (JP); Takehito Yanai, Tokyo (JP); Takuya Otsuka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/092,883

(22) PCT Filed: Jun. 19, 2006

(86) PCT No.: PCT/JP2006/312250

§ 371 (c)(1),
(2), (4) Date: May 7, 2008

(87) PCT Pub. No.: WO2007/148374

PCT Pub. Date: Dec. 27, 2007

(65) Prior Publication Data

US 2009/0116176 A1    May 7, 2009

(51) Int. Cl.
*H02B 5/06* (2006.01)
*H02B 5/00* (2006.01)

(52) U.S. Cl. ............ 361/619; 361/604; 361/612; 361/618

(58) Field of Classification Search ............ 361/602, 361/604, 611–612, 618–619
See application file for complete search history.

(56) References Cited

U.S. PATENT DOCUMENTS

| | | | | |
|---|---|---|---|---|
| 3,823,346 A | * | 7/1974 | Olsen | 361/612 |
| 3,881,766 A | * | 5/1975 | Pratsch | 361/115 |
| 4,262,323 A | * | 4/1981 | Yoshida | 361/604 |
| 4,638,403 A | * | 1/1987 | Amano et al. | 361/612 |
| 5,453,910 A | * | 9/1995 | Itou et al. | 361/612 |
| 5,898,565 A | * | 4/1999 | Yamauchi et al. | 361/612 |
| 6,624,372 B1 | * | 9/2003 | Ogawa et al. | 218/71 |
| 6,762,386 B2 | * | 7/2004 | Itou et al. | 218/43 |
| 6,787,725 B2 | * | 9/2004 | Kim et al. | 218/57 |

(Continued)

FOREIGN PATENT DOCUMENTS

EP    00875971 A    *    3/2004

(Continued)

OTHER PUBLICATIONS

English translation of JP10-257622.*

(Continued)

*Primary Examiner*—Robert J Hoffberg
(74) *Attorney, Agent, or Firm*—Buchanan Ingersoll & Rooney PC (57) ABSTRACT

The present invention provides a gas-insulated electric apparatus which includes: a vertically-arranged gas insulation main tank; a first gas insulation branch pipe connected to and making right angle with the gas insulation main tank; a second gas insulation branch pipe connected to and making right angle with the gas insulation main tank; a breaker manipulator which is arranged on an upper side of the main tank, a feeder-side current transformer which is incorporated in the first gas insulation branch pipe; a voltage transformer arranged on the first gas insulation branch pipe; and an arrestor arranged on the first gas insulation branch pipe and connected with the feeder.

16 Claims, 6 Drawing Sheets

U.S. PATENT DOCUMENTS

2009/0154069 A1 * 6/2009 Otsuka et al. ............... 361/612

FOREIGN PATENT DOCUMENTS

| JP | 46-004680 | A |   | 11/1971 |
|----|-----------|---|---|---------|
| JP | 58139607  | A | * | 8/1983  |
| JP | 58-168093 | U |   | 11/1983 |
| JP | 60002006  | A | * | 1/1985  |
| JP | 60213206  | A | * | 10/1985 |
| JP | 61-013513 | U |   | 1/1986  |
| JP | 61072007  | A | * | 4/1986  |
| JP | 61-072007 | U |   | 5/1986  |
| JP | 61-205205 | U |   | 12/1986 |
| JP | 62060410  | A | * | 3/1987  |
| JP | 63-044610 | U |   | 3/1988  |
| JP | 01122305  | A | * | 5/1989  |
| JP | 01283007  | A | * | 11/1989 |
| JP | 01286707  | A | * | 11/1989 |
| JP | 02-159908 | A |   | 6/1990  |
| JP | 06036311  | A | * | 2/1994  |
| JP | 06054419  | A | * | 2/1994  |
| JP | 06062513  | A | * | 3/1994  |
| JP | 0631313   | A | * | 4/1994  |
| JP | 06105425  | A | * | 4/1994  |
| JP | 08231763  | A | * | 9/1996  |
| JP | 10-257622 | A |   | 9/1998  |
| JP | 10257624  | A | * | 9/1998  |
| JP | 11089028  | A | * | 3/1999  |
| JP | 2001-145218 | A |   | 5/2001  |
| JP | 2001286016 | A | * | 10/2001 |

OTHER PUBLICATIONS

English translation of JP2001-145218.*

* cited by examiner

Fig. 9

GAS-INSULATED ELECTRIC POWER APPARATUS

BACKGROUND

1. Field of the Invention

The present invention relates to a gas-insulated electric apparatus which connects a gas insulation bus line and a feeder through a gas insulation breaker.

2. Description of the Related Art

A gas-insulated electric apparatus which connects a gas insulation bus line and a feeder via a gas insulation breaker is, as described in patent document 1 (JP-A-10-257622), for example, constituted of the combination of various constitutional apparatuses such as a gas insulation bus line, a gas insulation breaker, an isolator, a ground switch, a current transformer, a voltage transformer and the like.

For example, in FIG. 2 of the above-mentioned patent document 1, a current transformer 4 is arranged on a breaker portion 1a, an electric power cable connection portion 2 is arranged on a horizontal side of the current transformer 4, and a voltage transformer 6 is arranged on the electric power cable connection portion 2.

For example, in FIG. 1 of the above-mentioned patent document 1, a current transformer 4 is arranged on a breaker portion 1a, an electric power cable connection portion 2 is arranged on a horizontal side of the current transformer 4, and a voltage transformer 6 is arranged on a still horizontal side of the electric power cable connection portion 2.

Further, in FIG. 6 of the patent document 1, a current transformer 4 is arranged above and on a horizontal side of a breaker 1, a line-side isolator 5a, a maintenance inspection ground switch 5b, and a line-side ground switch 5c are arranged on a further horizontal side of the current transformer 4, and an electric power cable connection portion 2 are arranged on a further horizontal side of the line-side isolator 5a, the maintenance inspection ground switch 5b, and the line-side ground switch 5c.

Here, a breaker manipulator which trips the breaker portion 1a in response to a cut-off command signal or supplies electricity to the breaker 1a is not described in the above-mentioned patent document 1.

Further, an arrestor which protects a load applied to a constitutional apparatus of a gas-insulated electric apparatus and a feeder of a gas-insulated electric apparatus from a thunderbolt or a cloud-to-ground discharge is not also described in the above-mentioned document 1.

Also in patent document 2 (JP-A-2-159908) in which a technique corresponding to FIG. 6 in the above-mentioned patent document 1 is disclosed, neither a breaker manipulator nor an arrestor is described.

Patent Document 1: JP-A-10-257622 (FIG. 1, FIG. 2, FIG. 6 and explanations thereof)

Patent Document 2: JP-A-2-159908 (FIG. 1 and explanation thereof)

SUMMARY

As shown in FIG. 2 of the above-mentioned patent document 1, in the constitution in which a current transformer 4 is arranged on the breaker portion 1a, the electric power cable connection portion 2 is arranged on the horizontal side of the current transformer 4, and the voltage transformer 6 is arranged on the electric power cable connection portion 2, in the vertical direction, the current transformer 4 is arranged above the breaker portion 1a and, further, the voltage transformer 6 is positioned above the current transformer 4. Accordingly, in many cases, a total height of the gas-insulated electric apparatus exceeds a height limit of an ordinary road, for example, 3.6 m. In such a case, it is impossible to transport the gas-insulated electric apparatus in an assembled state in the ordinary road and hence, there arises an extra work that the gas-insulated electric apparatus is once disassembled before transporting and the gas-insulated electric apparatus is assembled on a site again after transporting.

As shown in FIG. 1 of the above-mentioned patent document 1, in the constitution in which the current transformer 4 is arranged on the breaker portion 1a, the electric power cable connection portion 2 is arranged on the horizontal side of the current transformer 4, and the voltage transformer 6 is arranged on the further horizontal side of the electric power cable connection portion 2, a total height of the gas-insulated electric apparatus becomes low compared to the case shown in FIG. 2 of the patent document 1 and hence, there hardly occurs case that the total height exceeds a height limit of an ordinary road, for example, 3.6 m whereby it is almost unnecessary to perform the extra work that the gas-insulated electric apparatus is once disassembled before transporting and the gas-insulated electric apparatus is assembled on a site again after transporting. However, a total length of the gas-insulated electric apparatus in the horizontal direction is elongated compared to the case shown in FIG. 2 of patent document 1 and hence, an installation space for the gas-insulated electric apparatus is increased. For example, when the gas-insulated electric apparatus is applied to an indoor power substation, there arises a drawback that a building becomes large-sized thus pushing up a cost.

As shown in FIG. 6 of the patent document 1, a current transformer 4 is arranged above and on a horizontal side of a breaker 1, a line-side isolator 5a, a maintenance inspection ground switch 5b, and a line-side ground switch 5c are arranged on a further horizontal side of the current transformer 4, and an electric power cable connection portion 2 are arranged on a further horizontal side of the line-side isolator 5a, the maintenance inspection ground switch 5b, and the line-side ground switch 5c. However, with such a constitution, although a total height of the gas-insulated electric apparatus becomes further lower than a corresponding height of the gas-insulated electric apparatus shown in FIG. 1 of the patent document 1, there arises a drawback that a total length of the gas-insulated electric apparatus in the horizontal direction becomes further elongated compared with the case of FIG. 1 of the patent document 1.

Also in the patent document 2, although a total height of the gas-insulated electric apparatus becomes further lower than a corresponding height of the gas-insulated electric apparatus shown in FIG. 1 of the patent document 1, there arises a drawback that a total length of the gas-insulated electric apparatus becomes further elongated compared with the case of FIG. 1 of the patent document 1.

The present invention has been made under the above-mentioned circumferences and it is an object of the present invention to realize the miniaturization of both a length and a height a gas-insulated electric apparatus by also taking an arrestor into consideration.

The present invention provides a gas-insulated electric apparatus including a vertically-arranged gas insulation main tank which incorporates a vertically-arranged gas insulation breaker therein; a first gas insulation branch pipe which is connected with one side of an upper portion of the gas insulation main tank while making a substantially right angle with the extending direction of the gas insulation main tank and pulls out a feeder from a movable side of the gas insulation breaker; a second gas insulation branch pipe which is connected with one side of a lower portion of the gas insulation main tank while making a substantially right angle with the extending direction of the gas insulation main tank and connects a fixed side of the gas insulation breaker to the gas insulation bus line; a breaker manipulator which is arranged on an upper side in the extending direction of the gas insulation main tank; a feeder-side current transformer which is incorporated in the first gas insulation branch pipe; a voltage transformer which is arranged on the first gas insulation branch pipe in a state that the voltage transformer is positioned above the first gas insulation branch pipe and uses the feeder as a primary conductor; and an arrestor which is arranged on the first gas insulation branch pipe in a state that the arrestor is positioned above the first gas insulation branch pipe and is connected with the feeder.

A gas-insulated electric apparatus according to the present invention includes a vertically-arranged gas insulation main tank which incorporates a vertically-arranged gas insulation breaker therein; a first gas insulation branch pipe which is connected with one side of an upper portion of the gas insulation main tank while making a substantially right angle with the extending direction of the gas insulation main tank and pulls out a feeder from a movable side of the gas insulation breaker; a second gas insulation branch pipe which is connected with one side of a lower portion of the gas insulation main tank while making a substantially right angle with the extending direction of the gas insulation main tank and connects a fixed side of the gas insulation breaker to the gas insulation bus line; a breaker manipulator which is arranged on an upper side in the extending direction of the gas insulation main tank; a feeder-side current transformer which is incorporated in the first gas insulation branch pipe; a voltage transformer which is arranged on the first gas insulation branch pipe in a state that the voltage transformer is positioned above the first gas insulation branch pipe and uses the feeder as a primary conductor; and an arrestor which is arranged on the first gas insulation branch pipe in a state that the arrestor is positioned above the first gas insulation branch pipe and is connected with the feeder. Accordingly, it is possible to realize the miniaturization of both a length and a height the gas-insulated electric apparatus by also taking an arrestor into consideration.

DETAILED DESCRIPTION

Embodiment 1

Figure 1:
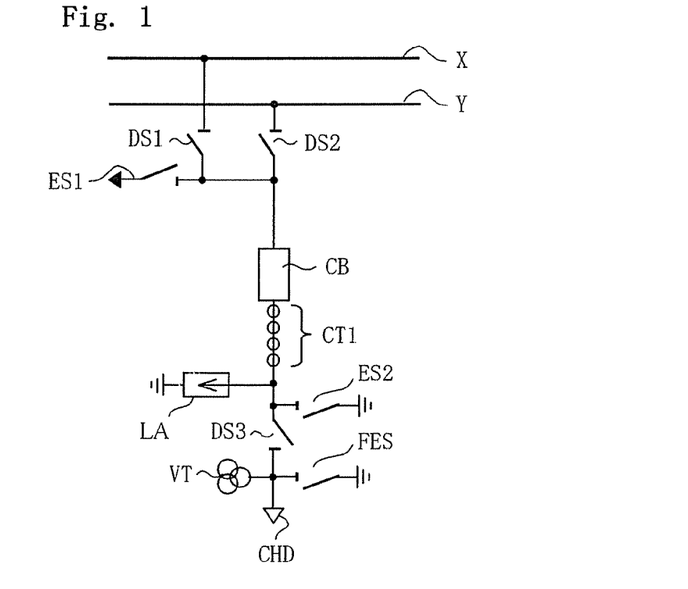
FIG. 1 A system view showing an embodiment 1 of the present invention and also showing one example of an electricity supply system of a double-bus-line method.
Figure 2:
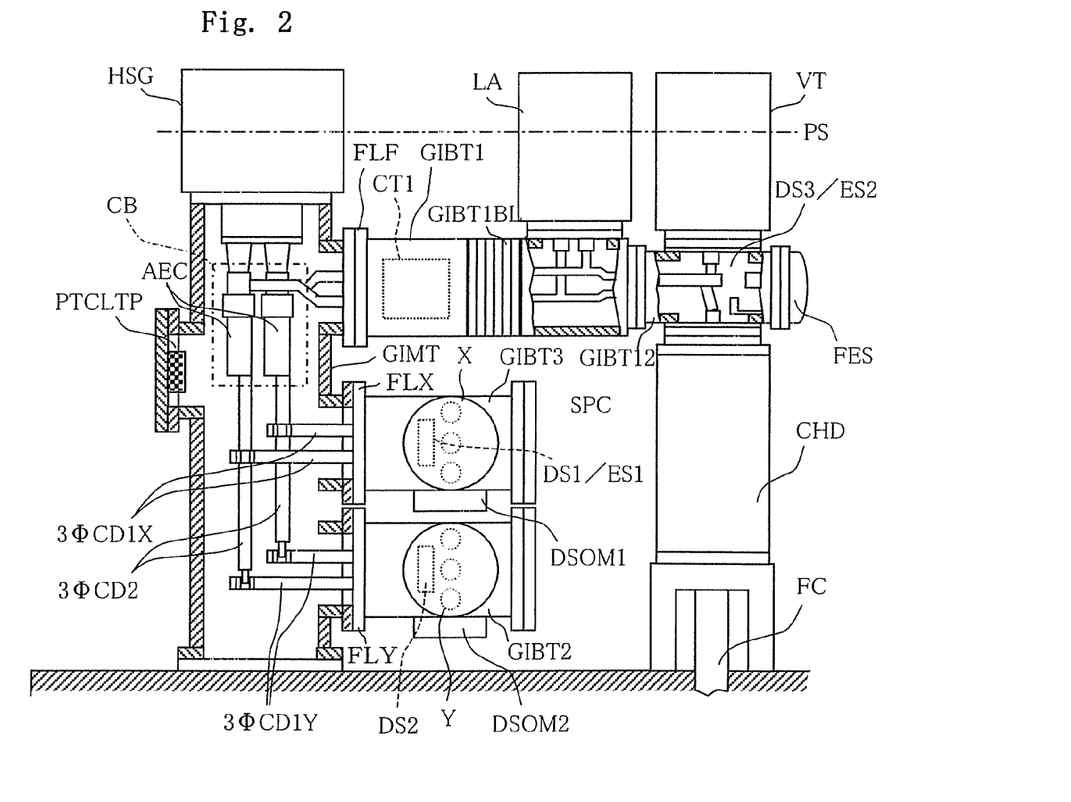
FIG. 2 A side view showing the embodiment 1 of the present invention and also showing a portion of one example of gas-insulated electric apparatus corresponding to the system view of FIG. 1.
Figure 3:
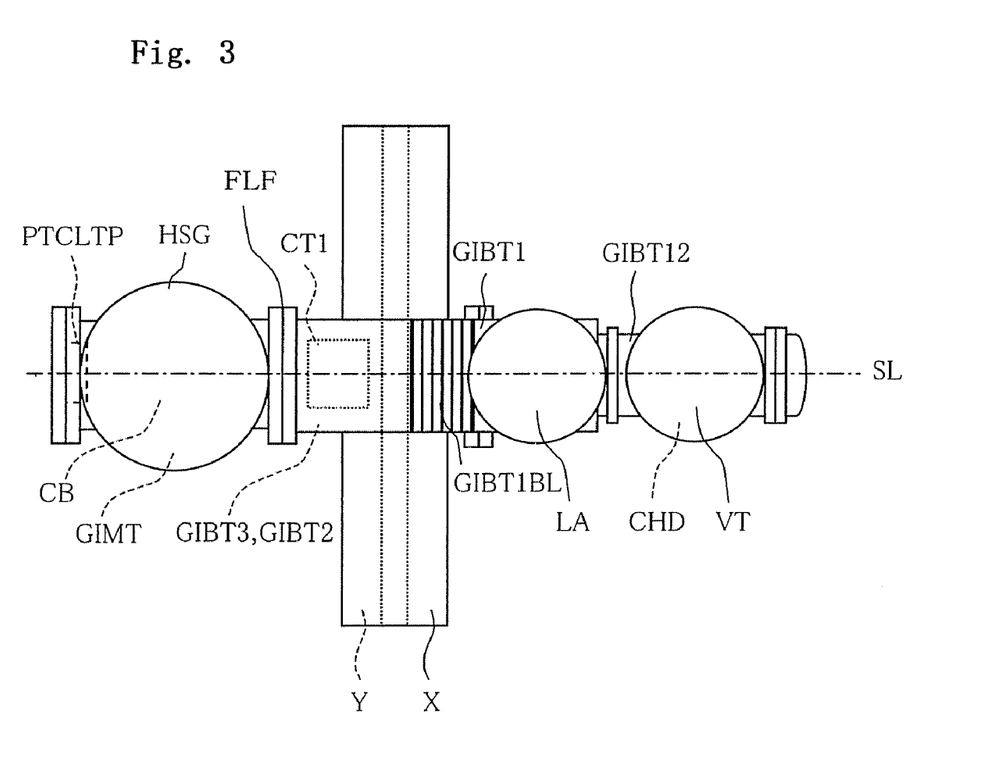
FIG. 3 A plan view showing the embodiment 1 of the present invention and also a plan view of the gas-insulated electric apparatus shown in FIG. 2.

An embodiment 1 of the present invention is explained in conjunction with FIG. 1 to FIG. 3. FIG. 1 is a system view showing one example of an electricity supply system adopting a double-bus-line method. FIG. 2 is a side view with a part in cross section showing one example of a gas-insulated electric apparatus corresponding to the system view shown in FIG. 1. FIG. 3 is a plan view of the gas-insulated electric apparatus shown in FIG. 2. Here, in FIG. 1 to FIG. 3, same symbols are given to identical parts.

In one example of the electricity supply system adopting a double-bus-line method according to the embodiment 1 of the present invention, as shown in FIG. 1, double bus lines X, Y are connected with a breaker CB of a feeder by way of bus-line-side isolators DS1, DS2. The breaker-CB-side of the bus-line-side isolators DS1, DS2 and the isolator-DS1-DS2-side of the breaker CB are connected with a ground switch ES1. Between a cable head CHD which constitutes a connection terminal of a feeder cable and the breaker CB, a current transformer CT1 on a feeder side, an arrestor LA, a feeder-side isolator DS3, a voltage transformer VT, a feeder-side ground switch ES2, and a line-side ground switch FES are connected. These respective apparatuses are integrally formed into a gas-insulated electric apparatus by mutually connecting these electricity supply systems in a gas insulating manner. The constitution of the gas-insulated electric apparatus shown in FIG. 2 is provided for miniaturizing both a width and a height of the gas-insulated electric apparatus by also taking the arrester into consideration. Accordingly, the gas-insulated electric apparatus of the present invention fundamentally differs from the gas-insulated electric apparatuses in the above-mentioned patent document 1 and patent document 2 in which no intention of miniaturizing both a width and a height of the gas-insulated electric apparatus by also taking the arrester into consideration is found.

That is, the constitution of this embodiment is configured such that a gas insulation main tank GIMT, a first gas insulation branch pipe GIBT1, a second gas insulation branch pipe GIBT2, a third gas insulation branch pipe GIBT3, the double bus lines X, Y, the bus-line-side isolators DS1, DS2, the breaker CB, the ground switch ES1, the cable head CHD, the current transformer CT1, the arrester LA, the isolator DS3, the voltage transformer VT, the ground switch ES2, the line-side ground switch FES and the like are physically arranged as shown in FIG. 2 and FIG. 3.

Particularly, the gas-insulated electric apparatus is constituted of the vertically-arranged gas insulation main tank GIMT which incorporates the vertically-arranged gas insulation breaker CB therein, the first gas insulation branch pipe GIBT1 which is connected with one side of an upper side of the gas insulation main tank GIMT by way of a flange FLF while making a substantially right angle with the extending direction of the gas insulation main tank GIMT and pulls out the feeder from a movable side of the gas insulation breaker CB, the second gas insulation branch pipe GIBT2 which is connected with one side of a lower side of the gas insulation main tank GIMT by way of a flange FLY while making a substantially right angle with the extending direction of the gas insulation main tank GIMT and connects a fixed side of the gas insulation breaker CB to the gas insulation bus line Y, a breaker manipulator HSG which is arranged on an upper side in the extending direction of the gas insulation main tank GIMT, the feeder-side current transformer CT1 which is incorporated in the first gas insulation branch pipe GIBT1, the voltage transformer VT which is arranged on the first gas insulation branch pipe GIBT1 in a state that voltage transformer VT is positioned above the first gas insulation branch pipe GIBT1 and uses the feeder as a primary conductor, and the arrestor LA which is arranged on the first gas insulation branch pipe GIBT1 in a state that the arrestor LA is positioned above the first gas insulation branch pipe GIBT1 and is connected with the feeder. As shown in FIG. 2, the height of the upper end of each of the breaker manipulator, the voltage transformer and the arrestor is substantially at the same level in the gas-insulated electric apparatus. That is, the height of the gas-insulated electric apparatus at the upper end of each of the breaker manipulator, the voltage transformer and the arrestor is substantially the same. Due to such a constitution, both a height and a length of the gas-insulated electric apparatus can be miniaturized.

The second gas insulation branch pipe GIBT2 is positioned below the first gas insulation branch pipe GIBT1 and extends in parallel to the first gas insulation branch pipe GIBT1.

The third gas insulation branch pipe GIBT3 is connected to one side of a lower portion of the gas insulation main tank GIMT by way of a flange FLX while substantially making a right angle with the extending direction of the gas insulation main tank GIMT and connects the fixing side of the gas insulation breaker CB to gas insulation bus line X. The third gas insulation branch pipe GIBT3 is positioned between the first gas insulation branch pipe GIBT1 and the second gas insulation branch pipe GIBT2 and extends in parallel with the first gas insulation branch pipe GIBT1 and the second gas insulation branch pipe GIBT2 respectively.

The gas insulation bus line X and the gas insulation bus line Y constitute so-called double bus lines. These double bus lines X, Y are vertically arranged at an upper position and a lower position respectively, and both double bus lines X, Y extend in parallel with each other within a region of the gas-insulated electric apparatus.

All of the breaker manipulator HSG, the voltage transformer VT and the arrestor LA are, particularly as shown in FIG. 2, formed on a plane PS which makes a substantially right angle with the extending direction of the gas insulation main tank GIMT.

The breaker manipulator HSG, the feeder-side current transformer CT1, the arrestor LA and the voltage transformer VT are, particularly as shown in FIG. 3, arranged on a straight line SL which makes a substantially right angle with the extending direction of the gas insulation main tank GIMT.

The vertically-arranged cable head CHD which extends in parallel to the gas insulation main tank GIMT and pulls the feeder to the outside (load side) is, particularly as shown in FIG. 2, arranged below the first gas insulation branch pipe GIBT1.

To an end portion of the first gas insulation branch pipe GIBT1 on a side opposite to the gas insulation main tank GIMT, an additionally-mounted first gas insulation branch pipe GIBT12 is integrally connected. These first gas insulation branch pipes GIBT1, GIBT12 are coaxially communicated with each other with an insulation gas filled therein. Further, the vertically-arranged cable head CHD is directly connected to the first gas insulation branch pipe GIBT12 by way of a flange. Here, although the first gas insulation branch pipes GIBT1, GIBT12 are communicated with each other with an insulation gas filled therein, there may be also a case that the first gas insulation branch pipes GIBT1, GIBT12 are not communicated with each other using a well-known insulation spacer when necessary. Further, such communication may be made between these first gas insulation branch pipes GIBT1, GIBT12 and other devices, for example, between the first gas insulation branch pipe GIBT1 and the voltage transformer VT, between the first gas insulation branch pipe GIBT12 and the voltage transformer VT, between the first gas insulation branch pipe GIBT12 and the cable head CHD, between the gas insulation main tank GIMT and the third gas insulation branch pipe GIBT3, between the gas insulation main tank GIMT and the second gas insulation branch pipe GIBT2 and the like. However, there may be also a case in which the above-mentioned parts are not communicated with each other using the well-known insulation spacer when necessary, and embodiments 2 to 5 of the present invention described later are constituted in the same manner as the embodiment 1.

In the inside of a space SPC surrounded by the gas insulation main tank GIMT, the first gas insulation branch pipes GIBT1, GIBT12 and the cable head CHD, the second gas insulation branch pipe GIBT2, the gas insulation bus line Y, the third gas insulation branch pipe GIBT3 and the gas insulation bus line X are arranged.

Both the voltage transformer VT and the arrestor LA are of a gas insulation type. The voltage transformer VT and the arrestor LA are communicated with the gas insulation main tank GIMT by way of the first gas insulation branch pipes GIBT1, GIBT12 with an insulation gas filled therein.

Further, as exemplified in FIG. 3, one gas insulation Y bus line out of the gas insulation double-bus lines intersects the second gas insulation branch pipe GIBT2 in a state that one gas insulation Y bus line makes a right angle with the second gas insulation branch pipe GIBT2, and another gas insulation X bus line out of the gas insulation double-bus lines intersects the third gas insulation branch pipe GIBT3 in a state that another gas insulation X bus line makes a right angle with the third gas insulation branch pipe GIBT3.

Either one of the gas insulation Y bus line and the another gas insulation X bus line of the gas insulation double-bus lines is, as shown in the drawing, formed of a three-phase collective gas insulation bus line. Here, the gas insulation bus lines X, Y may be formed of a phase-separation gas insulation bus line which is separated for respective phases. However, when a phase-separation gas insulation bus line method is adopted, the structure of the gas insulation double bus lines including devices which are connected or joined to the bus lines becomes complicated. Accordingly, although it may be possible to adopt the phase separation gas insulation bus line method in a high-voltage system which exceeds 60 kv by one rank, for example, it is preferable to adopt the three-phase collective gas insulation bus line method which obviates the complicated structure in the system of 60 kv level or below the 60 kv level, for example.

Further, in an intersecting portion of the gas insulation Y bus line and the second gas insulation branch pipe GIBT2 and in an intersecting portion of the gas insulation X bus line and the third gas insulation branch pipe GIBT3, a bus-line-side isolators DS2 and a bus-line-side isolator/ground switch DS1/ES1 are incorporated. Manipulators DSOM2, DSOM1 of the isolator are arranged below the intersecting portion of the gas insulation Y bus line and the second gas insulation branch pipe GIBT2 and below the intersecting portion of the gas insulation X bus line and the third gas insulation branch pipe GIBT3.

Here, the bus-line-side isolator/ground switch DS1/ES1 is well known and hence, the illustration of the specific structure thereof is omitted. Further, the bus-line-side isolator/ground switch DS1/ES1 is rotated from an isolator insertion position to an isolator release position by being manipulated by the manipulator DSOM1, and when the bus-line-side isolator/ground switch DS1/ES1 is further rotated, the bus-line-side isolator/ground switch DS1/ES1 reaches a ground position where the bus-line-side isolator/ground switch DS1/ES1 is connected to a ground terminal which, in turn, is connected to a ground potential tank or pipe, while when the bus-line-side isolator/ground switch DS1/ES1 is manipulated in the reverse direction, the bus-line-side isolator/ground switch DS1/ES1 sequentially reaches respective positions.

Further, the gas-insulated electric apparatus of the present invention also includes first three-phase linear connection conductors 3ΦCD1Y, 3ΦCD1X which are arranged in the inside of the gas insulation main tank GIMT in a projecting manner and are connected to one gas insulation Y bus line of the gas insulation double-bus lines and another gas insulation X bus line of the gas insulation double-bus lines, and a second three-phase linear connection conductor 3ΦCD2 which is arranged in the inside of the gas insulation main tank GIMT and has an upper end thereof connected to the gas insulation breaker CB and has a lower end and an intermediate portion thereof respectively connected to the first connection conductors 3ΦCD1Y, 3ΦCD1X. Further, the second connection conductors 3ΦCD2 is, as shown in the drawing, connected to the first connection conductors 3ΦCD1Y, 3ΦCD1X using well-known tulip contacts in a state that the second connection conductors 3ΦCD2 make a right angle with the first connection conductors 3ΦCD1Y, 3ΦCD1X. Due to such a constitution, a connection—use bent conductive body for connecting the first connection conductors 3ΦCD1Y, 3ΦCD1X and the second connection conductors 3ΦCD2 becomes unnecessary and, at the same time, it is possible to arrange a bus-line-side current transformer (CT2 described later) which may arbitrarily become necessary.

Further, as shown in the drawings, the gas insulation breaker CB and devices which are arranged on a feeder side as viewed from the gas insulation breaker CB constitute a three-phase collective gas insulation apparatus. Here, the gas insulation breaker CB and devices which are arranged on a feeder side as viewed from the gas insulation breaker CB may be formed of an apparatus which is separated for respective phases, that is, may be formed of a phase-separation gas insulation apparatus. However, when a phase-separation method in which the apparatus is separated for the respective phases is adopted, the structure of the gas insulation apparatus becomes complicated. Accordingly, although it may be possible to adopt the phase-separation method in a high-voltage system which exceeds 60 kv by one rank, for example, it is preferable to adopt the three-phase collective method which obviates the complicated structure in the system of 60 kv level or below the 60 kv level in the same manner as the embodiment 1, for example.

Further, as shown in the drawing, the first gas insulation branch pipe GIBT1 which pulls the feeder from a movable side of the gas insulation breaker CB includes a bellows GIBT1BL in series. The bellows GIBT1BL can expand and shrink due to the structure thereof and hence, assembling of the first gas insulation branch pipe GIBT1 into a gap defined between the cable-head-CHD-side tank which constitutes a connection end of the feeder cable FC and the gas insulation main tank GIMT and removal of the first gas insulation branch pipe GIBT1 from the gap defined between the cable-head-CHD-side tank and the gas insulation main tank GIMT can be easily performed at the time of occurrence of accident or inspection.

Further as shown in the drawing, the breaker manipulator HSG of the gas insulation breaker CB is positioned outside the gas insulation main tank GIMT and is mounted on the upper portion of the gas insulation main tank GIMT and an arc-extinguishing chamber AEC of the vertically-arranged gas insulation breaker CB is positioned at a lower portion side of the gas insulation breaker CB.

Further, as shown in the drawing, a particle trap PTCLTP is formed on a side wall of the gas insulation main tank GIMT corresponding to a lower end portion of the arc-extinguishing chamber AEC. Although the particle trap PTCLTP per se is known, in the embodiment 1, the particle trap PTCLTP which is formed on the side wall of the gas insulation main tank GIMT corresponding to the lower end portion of the arc-extinguishing chamber AEC is configured to trap scattering and floating metal vapor which is generated due to a following phenomenon. That is, a slight quantity of metal vapor which is evaporated from a contact by an arc at the time of breaking operation of the gas insulation breaker CB scatters from the lower end portion of the arc-extinguishing chamber AEC.

Embodiment 2

Figure 4:
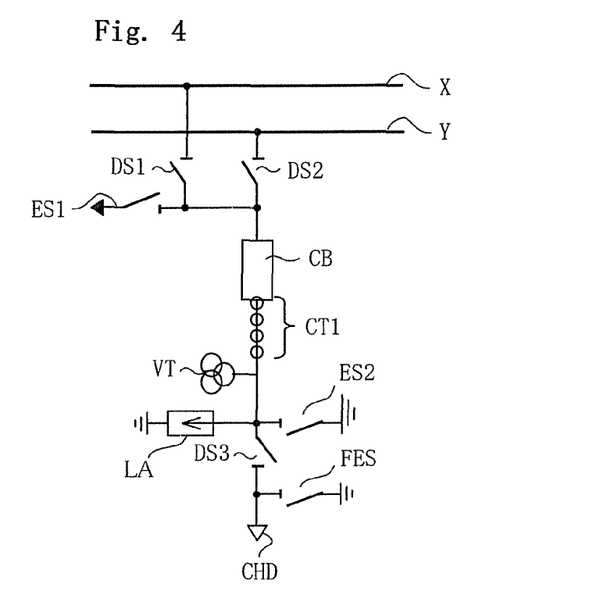
FIG. 4 A system view showing an embodiment 2 of the present invention and also showing one example of an electricity supply system of a double-bus-line method.
Figure 5:
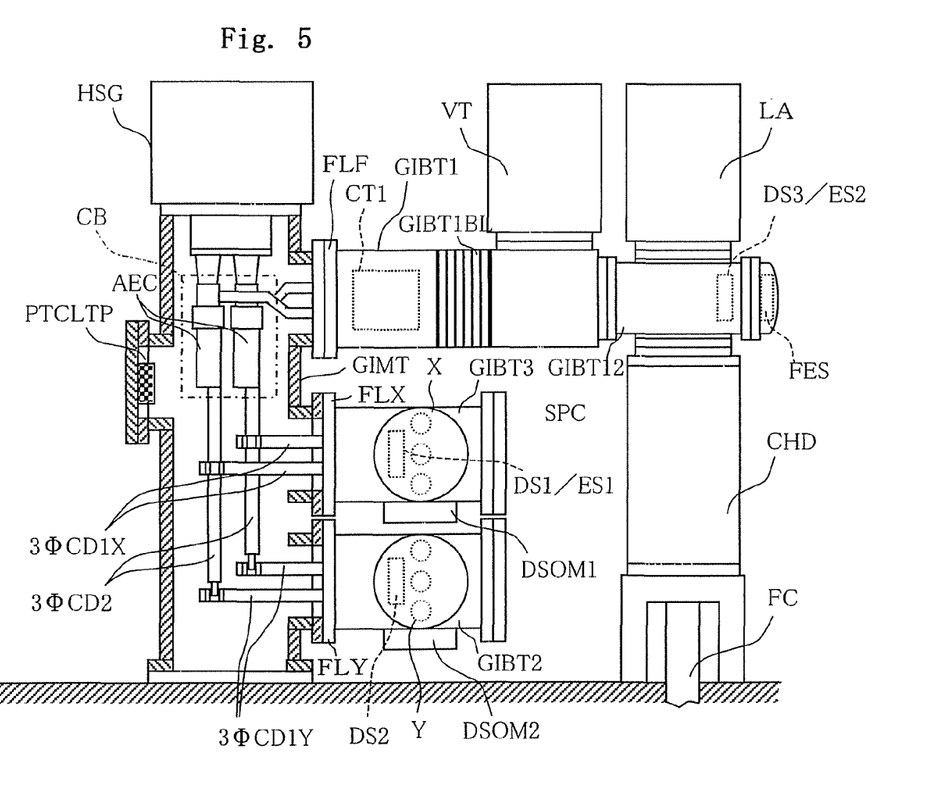
FIG. 5 A side view showing the embodiment 2 of the present invention and also showing a portion of one example of gas-insulated electric apparatus corresponding to the system view of FIG. 4

Hereinafter, an embodiment 2 of the present invention is explained in conjunction with FIG. 4 and FIG. 5. FIG. 4 is a system view showing another example of an electricity supply system adopting a double-bus-line method. FIG. 5 is a side view with a part in cross section showing one example of a gas-insulated electric apparatus corresponding to the system view shown in FIG. 4. Here, in FIG. 4 and FIG. 5, same symbols are given to parts identical or corresponding to the parts shown in FIG. 1 to FIG. 3. The explanation of the embodiment 2 hereinafter is made mainly with respect to points which differ from the constitution shown in FIG. 1 to FIG. 3, and the explanation of other constitutions and parts is omitted.

The embodiment 2 describes, as exemplified in FIG. 5, an example in which a layout of the voltage transformer VT and the arrester LA is opposite to the layout of the voltage transformer VT and the arrester LA in the embodiment 1 of the present invention. That is, although the embodiment 1 of the present invention exemplifies a case in which the voltage transformer VT is directly arranged right above the vertically-arranged cable head CHD, the embodiment 2 exemplifies a case in which the arrester LA directly is arranged above the vertically-arranged cable head CHD. The embodiment 2 can acquire the same advantageous effects as the embodiment of the present invention with respect to a point that both the height and the length of the gas-insulated electric apparatus can be miniaturized.

Embodiment 3

Figure 6:
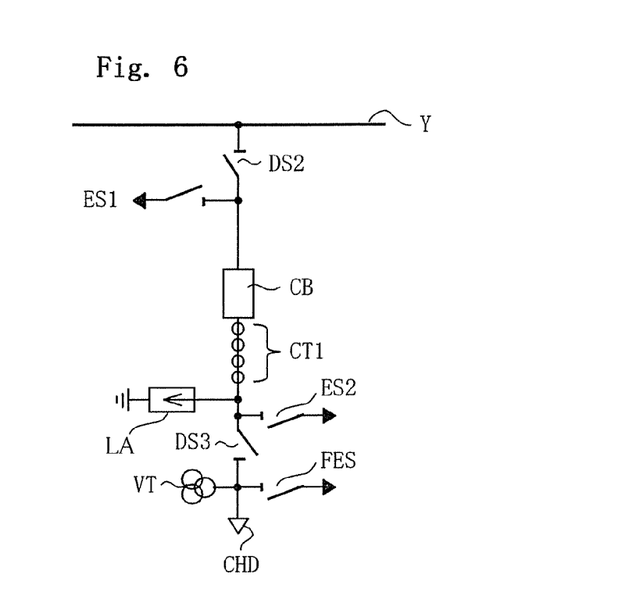
FIG. 6 A system view showing an embodiment 3 of the present invention and also showing one example of an electricity supply system of a single-bus-line method.
Figure 7:
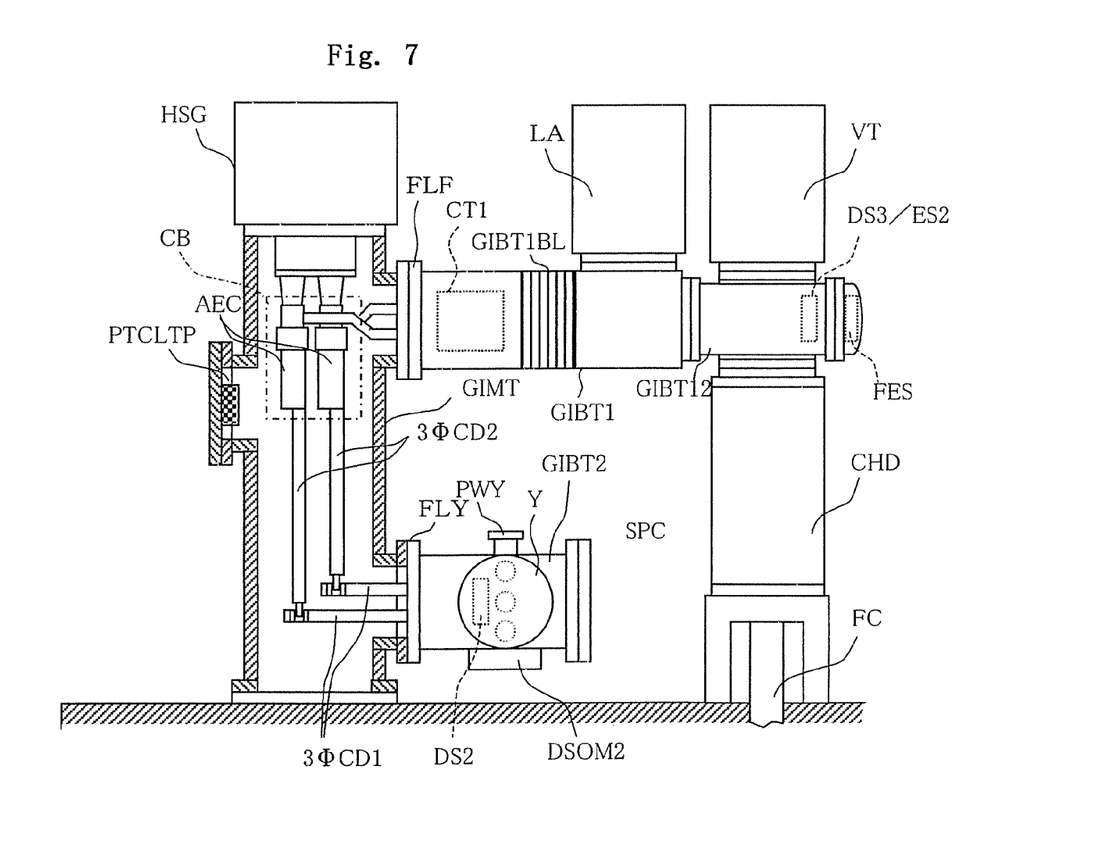
FIG. 7 A side view showing the embodiment 3 of the present invention and also showing a portion of one example of gas-insulated electric apparatus corresponding to the system view of FIG. 6.

Hereinafter, an embodiment 3 of the present invention is explained in conjunction with FIG. 6 and FIG. 7. FIG. 6 is a system view showing another example of an electricity supply system adopting a double-bus-line method. FIG. 7 is a side view with a part in cross section showing one example of a gas-insulated electric apparatus corresponding to the system view shown in FIG. 6. Here, in FIG. 6 and FIG. 7, same symbols are given to parts identical or corresponding to the parts shown in FIG. 1 to FIG. 5. The explanation of the embodiment 3 hereinafter is made mainly with respect to points which differ from the constitutions shown in FIG. 1 to FIG. 5, and the explanation of other constitutions and parts is omitted.

The embodiment 3, as exemplified in FIG. 7, differs from the embodiment 1 with respect to a point that only the gas insulation bus line Y which constitutes a single bus line is mounted and a point that a peeping window PWY is formed above an intersection portion of the second gas insulation branch pipe GIBT2 and the gas insulation bus line Y.

The peeping window PWY is positioned directly above the manipulation device DSOM2 which is formed below the second gas insulation branch pipe GIBT2.

Although the first gas insulation branch pipe GIBT1 is arranged above the peeping window PWY, a sufficient space is formed between the first gas insulation branch pipe GIBT1 and the peeping window PWY and hence, the inside of the gas-insulated electric apparatus can be easily viewed from the peeping window PWY.

Here, the peeping window PWY and the manipulation device DSOM2 may be arranged on the same side, for example, both the peeping window PWY and the manipulation device DSOM2 may be arranged above the second gas insulation branch pipe GIBT2.

Embodiment 4

Figure 8:
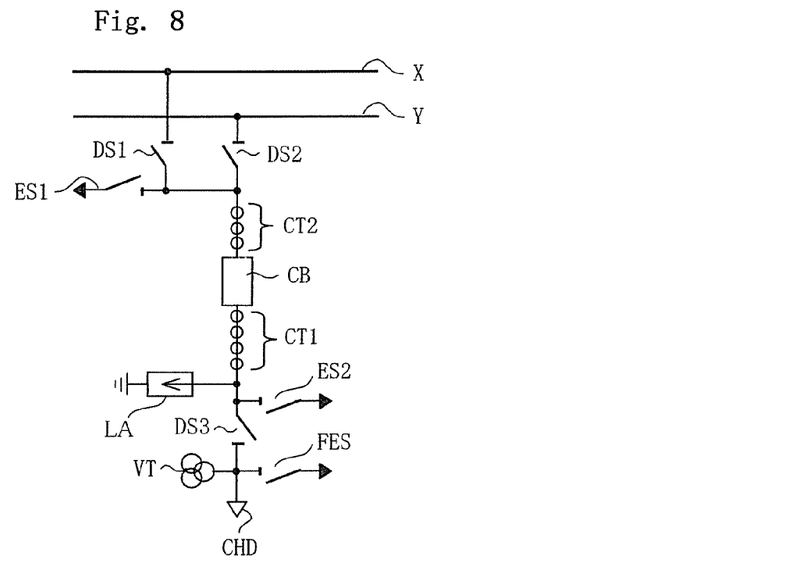
FIG. 8 A system view showing an embodiment 4 of the present invention and also showing another example of an electricity supply system of a double-bus-line method.
Figure 9:
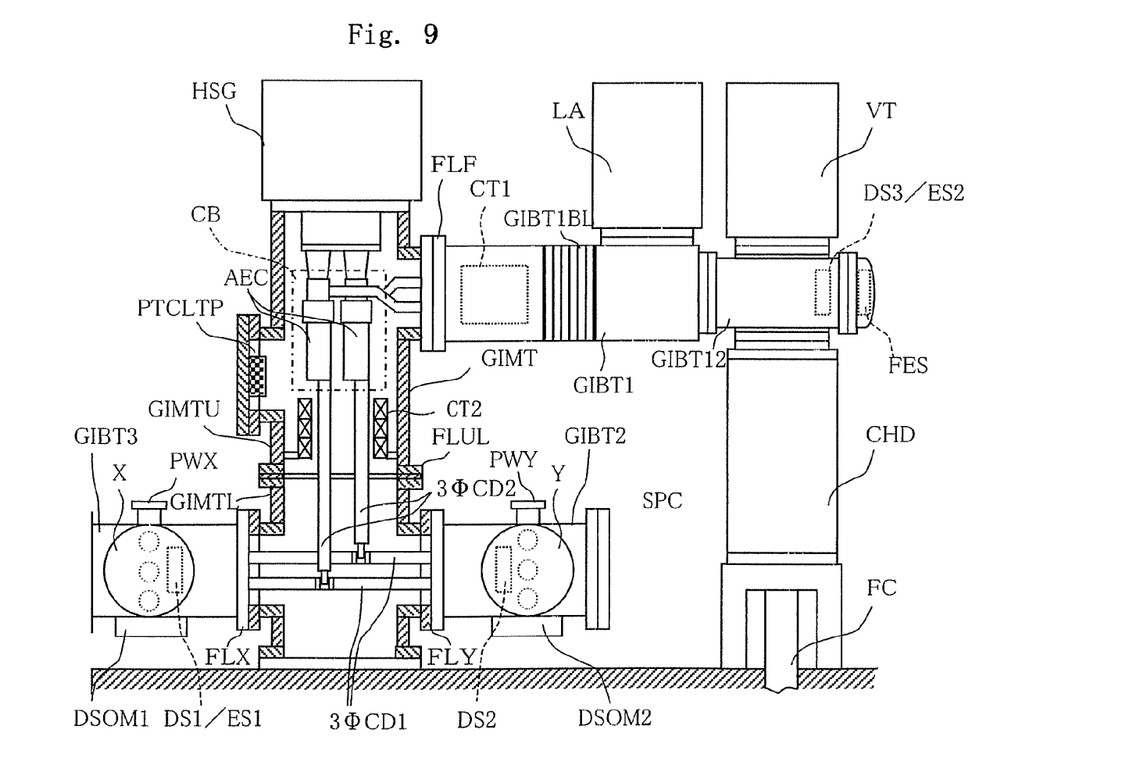
FIG. 9 A side view showing the embodiment 4 of the present invention and also showing a portion of one example of gas-insulated electric apparatus corresponding to the system view of FIG. 8.

Hereinafter, an embodiment 4 of the present invention is explained in conjunction with FIG. 8 and FIG. 9. FIG. 8 is a system view showing another example of an electricity supply system adopting a double-bus-line method. FIG. 9 is a side view with a part in cross-section showing one example of a gas-insulated electric apparatus corresponding to the system view shown in FIG. 8. Here, in FIG. 8 and FIG. 9, same symbols are given to parts identical or corresponding to the parts shown in FIG. 1 to FIG. 7. The explanation of the embodiment 4 hereinafter is made mainly with respect to points which differ from the constitutions shown in FIG. 1 to FIG. 7, and the explanation is omitted.

The embodiment 4 is, as exemplified in FIG. 8 and FIG. 9, differs from the above-mentioned FIG. 1 to FIG. 7 with respect to a point that the bus-line-side current transformer CT2 which is used by the double bus lines X, Y in common is provided on the double bus lines X, Y side of the breaker CB and a point that the double bus lines X, Y are positioned on both circumferential sides of a lower portion of the gas insulation main tank GIMT.

With respect to the physical arrangement of the bus-line-side current transformer CT2, as exemplified in FIG. 9, the bus-line-side current transformer CT2 is positioned between the first connection conductor 3ΦCD1 and the arc-extinguishing chamber AEC of the gas insulation breaker CB and is arranged around the second connection conductor 3ΦCD2 so as to detect a current of the second connection conductor 3ΦCD2. Due to such a constitution, it becomes unnecessary to individually provide the bus-line-side current transformer CT2 corresponding to the respective double bus lines X, Y.

Since the second and the third gas insulation branch pipes GIBT2, GIBT3 and the bus lines X, Y are positioned on both circumferential sides of the lower portion of the gas insulation main tank GIMT, even when the bus-line-side current transformer CT2 is arranged between the first connection conductor 3ΦCD1 and the arc extinguishing chamber AEC of the gas insulation breaker CB, it is unnecessary to increase a height of the gas insulation main tank GIMT and hence, the height of the gas insulation main tank GIMT can be maintained within a height limit of the ordinary road whereby it is possible to apply the gas-insulated electric apparatus when there is an enough apparatus installation space.

Further, in the embodiment 4 is, in other words, as exemplified in FIG. 9, the gas-insulated electric apparatus includes the bus-line-side current transformer CT2 which is used for the double bus lines X, Y in common and, further, includes peeping windows PWX, PWY.

Further, the embodiment 4 is constituted of the vertically-arranged gas insulation breaker CB which is incorporated in the inside of the vertically-arranged gas insulation main tank GIMT, the first gas insulation branch pipe GIBT1 which is connected with one side of an upper portion of the gas insulation main tank GIMT by way of a flange FLF while making a substantially right angle with the extending direction of the gas insulation main tank GIMT, incorporates the current transformer CT1 therein and, at the same time, and pulls out the feeder from a movable side of the gas insulation breaker CB, the second and third gas insulation branch pipes GIBT2, GIBT3 which are connected to both circumferential sides of the lower portion of the gas insulation main tank GIMT by way of a flange FLX, a flange FLY while making a substantially right angle with the extending direction of the gas-insulated main tank GIMT, wherein one of second and third gas insulation branch pipes GIBT2, GIBT3 connects the fixed side of the gas insulation breaker CB to a gas insulation Y bus line on one of the gas insulation double bus lines and another connects the fixed side of the gas insulation breaker CB to another gas insulation X bus line of the gas insulation double bus lines respectively. In this manner, the second and the third gas insulation branch pipes GIBT2, GIBT3 and the bus lines X, Y are positioned on both circumferential sides of the lower portion of the gas insulation main tank GIMT and hence, the earthquake resistance is enhanced and, at the same time, it is possible to ensure a space for installing the bus-line-side current transformer CT2 without increasing the height of the gas insulation main tank GIMT. Accordingly, a sufficient operation space for maintenance, inspection and the like can be ensured between the first gas insulation branch pipe GIBT1 and the second and the third gas insulation branch pipes GIBT2, GIBT3.

Here, the second and the third gas insulation branch pipes GIBT2, GIBT3 are coaxially arranged, the second gas insulation branch pipe GIBT2 is arranged right below the first gas insulation branch pipe GIBT1 in parallel with the first gas insulation branch pipe GIBT1 and hence, the first gas insulation branch pipe GIBT1 and the second and the third gas insulation branch pipes GIBT2, GIBT3 are arranged while making a right angle with the gas insulation main tank GIMT.

Embodiment 5

Hereinafter, an embodiment 5 of the present invention is explained in conjunction with FIG. 10 which is a side view with a part in cross section showing the gas-insulated electric apparatus. Here, in FIG. 10, same symbols are given to parts identical or corresponding to the parts shown in FIG. 1 to FIG. 9, and the explanation of the embodiment 5 hereinafter is made mainly with respect to points which differ from the constitutions shown in FIG. 1 to FIG. 9, and the explanation of other constitutions and parts is omitted.

Figure 10:
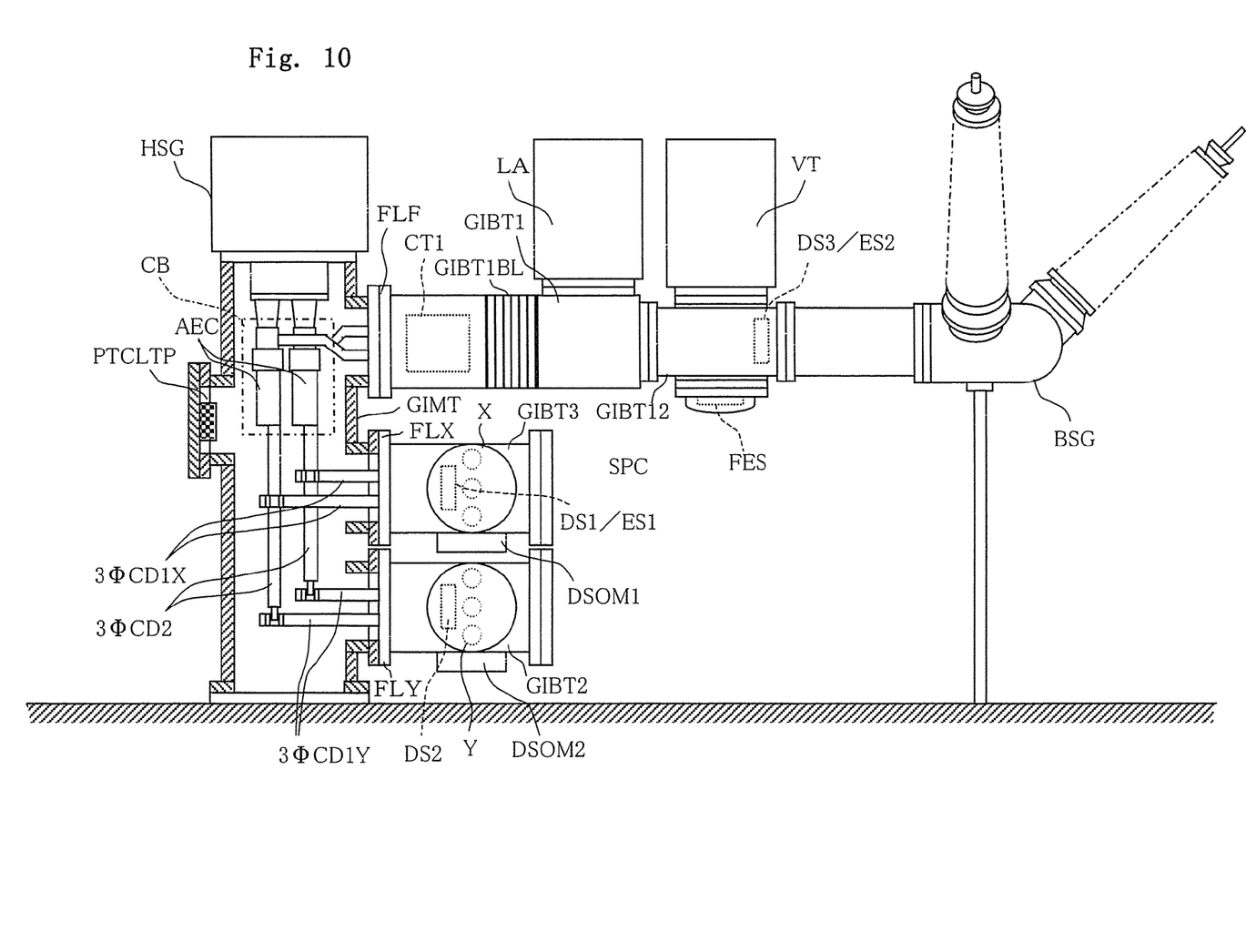
FIG. 10 A side view showing an embodiment 5 of the present invention and also showing a portion of another example of a gas-insulated electric apparatus.

The embodiment 5 describes, as exemplified in FIG. 10, an example in which a bushing BSG is used in place of the cable header CHD explained in conjunction with FIG. 1 to FIG. 9. The bushing BSG which pulls out the feeder to the outside is mounted such that the bushing BSG exists on extensions of the first gas insulating branch pipes GIBT1, GIBT12. Here, the bushing BSG is connected to the first gas insulation branch pipes GIBT1, GIBT12 at the field after being transferred to a site where the gas-insulated electric apparatus is installed.

The gas-insulated electric apparatus of the embodiment 5 is, as exemplified in FIG. 10, constituted substantially in the same manner as the embodiment 1 of the present invention with respect to other parts except for the bushing BSG and hence, the gas-insulated electric apparatus of the embodiment 5 can obtain the substantially same advantageous effects as the embodiment 1 of the present invention.

DESCRIPTION OF THE REFERENCE NUMERALS AND SIGNS

AEC: arc-extinguishing chamber of gas insulation breaker CB
BSG: bushing
CB: gas insulation breaker
CHD: cable head
CT1: current transformer
CT2: bus-line-side current transformer
DS1, DS2: bus-line-side isolator
DS3: isolator
DSOM1, DSOM2: manipulators of isolator
DS1/ES1: bus-line-side isolator/installed switch
ES1, ES2: ground switch
FC: feeder cable
FES: line-side ground switch
FLF: flange (first flange)
FLX: flange (third flange)
FLY: flange (second flange)
FLUL: flange
GIBT1: first gas insulation branch pipe
GIBT1 BL: bellows
GIBT2: second gas insulation branch pipe
GIBT3: third gas insulation branch pipe
GIBT12: additionally-mounted first gas insulation branch pipe
GIMT: gas insulation main tank
GIMTL: lower gas insulation main tank
GIMTU: upper gas insulation main tank
LA: arrestor
HSG: breaker manipulator
PS: plan view
PTCLTP: particle trap
PWX, PWY: peeping window
SL: straight line
SPC: space
VT: voltage transformer
X, Y: double bus line
3ΦCD1, 3ΦCD1X, 3ΦCD1Y: linear first connection conductor
3ΦCD2: linear second connection conductor

The invention claimed is:

1. A gas-insulated electric apparatus comprising:
a vertically-arranged gas insulation main tank which incorporates a vertically-arranged gas insulation breaker therein;
a first gas insulation branch pipe which is connected with one side of an upper portion of the gas insulation main tank while making a substantially right angle with the extending direction of the gas insulation main tank and pulls out a feeder from a movable side of the gas insulation breaker;
a second gas insulation branch pipe which is connected with one side of a lower portion of the gas insulation main tank while making a substantially right angle with the extending direction of the gas insulation main tank and connects a fixed side of the gas insulation breaker to a gas insulation bus line;
a breaker manipulator which is arranged on an upper side in the extending direction of the gas insulation main tank;
a feeder-side current transformer which is incorporated in the first gas insulation branch pipe;
a voltage transformer which is arranged on the first gas insulation branch pipe in a state that the voltage transformer is positioned above the first gas insulation branch pipe and uses the feeder as a primary conductor; and
an arrestor which is arranged on the first gas insulation branch pipe in a state that the arrestor is positioned above the first gas insulation branch pipe and is connected with the feeder,
wherein the second gas insulation branch pipe and the gas insulation bus line are arranged inside of a space surrounded by the gas insulation main tank and the first gas insulation branch pipe; and
the height of the gas-insulated electric apparatus at the upper end of each of the breaker manipulator, the voltage transformer and the arrestor is substantially the same.

2. A gas-insulated electric apparatus according to claim 1, wherein all of the breaker manipulator, the voltage transformer and the arrestor are formed on a plane which makes a substantially right angle with the extending direction of the gas insulation main tank.

3. A gas-insulated electric apparatus according to claim 2, wherein the breaker manipulator, the feeder-side current transformer, the arrestor and the voltage transformer are arranged along a straight line as viewed from above the apparatus which makes a substantially right angle with the extending direction of the gas insulation main tank.

4. A gas-insulated electric apparatus according to claim 3, wherein a vertically-arranged cable head which extends in parallel to the gas insulation main tank and pulls the feeder to the outside is arranged below the first gas insulation branch pipe.

5. A gas-insulated electric apparatus according to claim 4, wherein the space is further surrounded by the cable head.

6. A gas-insulated electric apparatus according to claim 3, wherein a bushing which pulls out the feeder to the outside is arranged on an extension of the first gas insulation branch pipe.

7. A gas-insulated electric apparatus according to claim 6, wherein both the voltage transformer and the arrestor are of a gas insulation type, and the voltage transformer and the arrestor communicate with the gas insulation main tank using an insulation gas by way of the first gas insulation branch pipe.

8. A gas-insulated electric apparatus according to claim 1, wherein the breaker manipulator, the feeder-side current transformer, the arrestor and the voltage transformer are arranged along a straight line as viewed from above the apparatus which makes a substantially right angle with the extending direction of the gas insulation main tank.

9. A gas-insulated electric apparatus according to claim 8, wherein a bushing which pulls out the feeder to the outside is arranged on an extension of the first gas insulation branch pipe.

10. A gas-insulated electric apparatus according to claim 9, wherein both the voltage transformer and the arrestor are of a gas insulation type, and the voltage transformer and the arrestor communicate with the gas insulation main tank using an insulation gas by way of the first gas insulation branch pipe.

11. A gas-insulated electric apparatus according to claim 1, wherein a vertically-arranged cable head which extends in parallel to the gas insulation main tank and pulls the feeder to the outside is arranged below the first gas insulation branch pipe.

12. A gas-insulated electric apparatus according to claim 11, wherein the space is further surrounded by the cable head.

13. A gas-insulated electric apparatus according to any claim 1, wherein a bushing which pulls out the feeder to the outside is arranged on an extension of the first gas insulation branch pipe.

14. A gas-insulated electric apparatus according to claim 13, wherein both the voltage transformer and the arrestor are of a gas insulation type, and the voltage transformer and the arrestor communicate with the gas insulation main tank using an insulation gas by way of the first gas insulation branch pipe.

15. A gas-insulated electric apparatus according to claim 1, wherein both the voltage transformer and the arrestor are of a gas insulation type, and the voltage transformer and the arrestor communicate with the gas insulation main tank using an insulation gas by way of the first gas insulation branch pipe.

16. A gas-insulated electric apparatus according to claim 1, wherein the first gas insulation branch pipe includes a bellows disposed in series with the first gas insulation branch pipe and configured to expand and shrink.

* * * * *